US008244598B2

(12) United States Patent
Jacobi et al.

(10) Patent No.: US 8,244,598 B2
(45) Date of Patent: *Aug. 14, 2012

(54) USING INFERRED INFORMATION ABOUT RECURRING GIFT GIVING EVENTS OF USERS TO PROVIDE MESSAGING TO AFFILATED USERS

(75) Inventors: Jennifer A. Jacobi, Seattle, WA (US); Michael McDaniel, Seattle, WA (US); Ryan J. Snodgrass, Kirkland, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,774

(22) Filed: Mar. 15, 2011

(65) Prior Publication Data

US 2011/0166956 A1 Jul. 7, 2011

Related U.S. Application Data

(60) Continuation of application No. 12/043,895, filed on Mar. 6, 2008, now Pat. No. 7,925,546, which is a division of application No. 09/933,277, filed on Aug. 20, 2001, now Pat. No. 7,356,490.

(51) Int. Cl.
*G06Q 30/00* (2012.01)
(52) U.S. Cl. ...................... 705/26.7; 705/26.1; 705/26.8
(58) Field of Classification Search ......... 705/26.1–27.2
See application file for complete search history.

(56) References Cited

U.S. PATENT DOCUMENTS

| 5,721,832 A | 2/1998 | Westrope et al. |
| 5,909,023 A | 6/1999 | Ono et al. |
| 6,026,376 A | 2/2000 | Kenney |
| 6,092,054 A | 7/2000 | Tackbary et al. |
| 6,493,724 B1 | 12/2002 | Cusack et al. |
| 6,598,026 B1 | 7/2003 | Ojha et al. |
| 6,609,106 B1 | 8/2003 | Robertson |
| 6,611,814 B1 | 8/2003 | Lee et al. |
| 6,669,088 B2 | 12/2003 | Veeneman |

(Continued)

FOREIGN PATENT DOCUMENTS

WO 9923591 A1 5/1999

(Continued)

OTHER PUBLICATIONS

Description of Amazon.com purchase sharing program in IDS filed Nov. 6, 2001, in grandparent application (of-record in parent application).

(Continued)

*Primary Examiner* — Will Allen
(74) *Attorney, Agent, or Firm* — Knobbe, Martens, Olson & Bear LLP (57) ABSTRACT

Various computer-implemented services are disclosed for increasing the utility of electronic wish lists, and for assisting users in making gift purchases. One such service automatically notifies a user when an item being accessed in an electronic catalog is on, or is similar to an item on, an electronic wish list of an "affiliated" user. The affiliations may be created explicitly by the users (e.g., by completing an online form), and/or implicitly based on actions performed by the users (e.g., when one user purchases a gift for another user). Another service automatically reminds a first user who is affiliated with a second user when a known or inferred gift-giving event of the second user is approaching. The reminder may include a link to a wish list of the second user, and/or may include or provide a link for viewing personalized gift recommendations for the second user.

26 Claims, 8 Drawing Sheets

```
Mail From: Reminders@retail.com                    [_][□][X]
File  Edit  View  Insert  Format  Help To:      Lisa Davis
     From:    reminders@retail.com
     Date:    January 10, 2001

Dear Lisa:

We just wanted to remind you that
     you purchased a gift for Bob Smith on
     January 25, 2000. Click here to view
     Bob's wish list, which was last updated
     on January 2, 2001.
```

U.S. PATENT DOCUMENTS

| | | |
|---|---|---|
| 6,865,546 B1 | 3/2005 | Song |
| 6,912,505 B2 | 6/2005 | Linden et al. |
| 6,917,922 B1 | 7/2005 | Bezos et al. |
| 7,356,490 B1 | 4/2008 | Jacobi et al. |
| 7,433,832 B1 | 10/2008 | Bezos et al. |
| 7,478,054 B1 | 1/2009 | Adams et al. |
| 2002/0019763 A1 | 2/2002 | Linden et al. |
| 2002/0077929 A1 | 6/2002 | Knorr et al. |
| 2002/0103789 A1 | 8/2002 | Turnbull et al. |
| 2002/0143664 A1 | 10/2002 | Webb |
| 2002/0194087 A1 | 12/2002 | Spiegel et al. |
| 2002/0198882 A1 | 12/2002 | Linden et al. |
| 2003/0023687 A1 | 1/2003 | Wolfe |
| 2003/0083961 A1 | 5/2003 | Bezos et al. |
| 2003/0105682 A1 | 6/2003 | Dicker et al. |
| 2003/0154135 A1 | 8/2003 | Covington et al. |
| 2003/0204449 A1 | 10/2003 | Kotas et al. |
| 2003/0233283 A1 | 12/2003 | Shah |

FOREIGN PATENT DOCUMENTS

| | | |
|---|---|---|
| WO | 0016227 A1 | 3/2000 |
| WO | 0031657 A1 | 6/2000 |
| WO | 0062223 A1 | 10/2000 |

OTHER PUBLICATIONS

"GiftPro.com Makes Sending a Gift Certificate from Many Major Retailers and Restaurants Easy," Business Editors & Retail Writers, Business Wire, New York, May 25, 1998, p. 1 (of-record in parent application).

FIG. 1

Wish List Notifications

| Your Favorite People: | Wish List Buddy | Favorite Reviewer | Shared Purchases Buddy | Delete |
|---|---|---|---|---|
| Bob Davis | ● | ○ | ● | ○ |
| Margaret Smith | ● | ● | ○ | ○ |

Save Changes

Add to your list of Favorite People:

| Name | email address | Wish List Buddy | Favorite Reviewer | Shared Purchases Buddy |
|---|---|---|---|---|
|  |  | ○ | ○ | ○ |
|  |  | ○ | ○ | ○ |
|  |  | ○ | ○ | ○ |

Save Changes

Automatically add a person as a Wish List Buddy whenever:

☑ I purchase a gift for that person
☑ The person purchases a gift for me

Save Changes

Wish List Buddies - we will notify you when an item you are viewing is on a wish list of one of these people Favorite Reviewer - we will notify you by email whenever one of these people submits a product review Shared Purchases Buddy - These people have permission to view your Shared Purchases and other information in your About You area. New Shared Purchases Buddies are invited by email to view your About You area.

USING INFERRED INFORMATION ABOUT RECURRING GIFT GIVING EVENTS OF USERS TO PROVIDE MESSAGING TO AFFILATED USERS

RELATED APPLICATIONS

This application is a continuation of U.S. application Ser. No. 12/043,895, filed Mar. 6, 2008 now U.S. Pat. No. 7,925,546, which is a division of U.S. application Ser. No. 09/933,277, filed Aug. 20, 2001 now U.S. Pat. No. 7,356,490, the disclosure of which is hereby incorporated by reference.

BACKGROUND OF THE INVENTION

1. Technical Field

The present disclosure relates to computer-implemented services for increasing the utility of electronic wish lists.

2. Description of the Related Art

In the field of business-to-consumer commerce, it is common for shopping sites to provide an electronic wish list service. Using such a service, a customer can select products from a store's electronic catalog, and add these products to a personal wish list or gift registry (collectively "wish list"). Typically, a wish list search engine is also provided to allow users to search for the wish lists of other users by name and/or other criteria. Further, in some systems, the creator of the wish list is prompted to enter the email addresses of those to be notified of the wish list, and the service sends an email message to these addresses with a link to the wish list.

When a user purchases an item from a wish list of another, the online merchant typically ships the item to the wish list owner—typically without revealing the physical address or other personal information of the wish list owner to the purchaser. Once the product has been purchased, the wish list service typically either removes the purchased product from the wish list, or displays an indication that the product has already been purchased. In the case of gift registries, the service may also indicate the number of units requested and the number purchased.

SUMMARY OF THE DISCLOSURE

One problem with existing wish list services is that users often fail to search for and view the wish lists of those for whom gifts are to be purchased. For example, a user may not know or remember that the target gift recipient has created a wish list. Further, the task of searching for the wish list of a target user can sometimes be burdensome, particularly if the target user has the same name as other wish list owners. Another problem is that existing wish list services generally do not help users remember when to purchase gifts for their friends and relatives. As a result of these and other deficiencies, existing wish list services have limited utility.

One inventive feature addresses some of the problems with existing wish list services by providing a computer-implemented service that automatically notifies a user when an item being accessed in an electronic catalog is on a wish list of an "affiliated" user (e.g., a friend or relative). In one embodiment, information about affiliations between individual users is captured and stored within a database associated with an online store. A user may specify his or her "affiliates" explicitly (e.g., by completing an online form) and/or implicitly (e.g., by purchasing a gift for, or sending an e-card to, another user). The online store also provides a wish list service through which users can add items from the catalog to personal wish lists, and can purchase items from the wish lists of others.

Another inventive feature involves automatically reminding those affiliated with a particular user of a known or predicted gift-giving event of that user. These reminders may include links to the wish lists of those whose known or predicted special event dates are approaching, and/or may include or provide a link to personalized gift recommendations for such users. The reminders may be conveyed by email, presented within a web page or other online display, or conveyed by postal mail. In one embodiment of this feature, information is captured in a database when a first user makes a wish list purchase, or other gift purchase, for a second user. When the anniversary of this purchase approaches, a reminder is transmitted by email to remind the first user of the prior purchase, and a link to the second user's wish list is included in this reminder email. Personalized gift recommendations may be included in place of or in addition to the wish list link. A decision of whether to generate the reminder may take into consideration the content of any gift message text entered by the first user, or the type of gift wrap selected by the first user, when purchasing the gift for the second user. For example, a reminder may be generated only if the gift message text included an annual-event-evidencing term such as "birthday" or "anniversary," or may be inhibited if the gift message text included a term such as "wedding" or "graduation" evidencing a non-annual special event.

The aforementioned features may be implemented individually or in combination within a web site system, an online services network, an interactive television system, a system that supports online browsing via telephone by voice, a system in which the catalog is accessed from handheld wireless devices, an system in which the catalog is viewed on terminals within physical stores, or any other type of system that permits users to interactively browse an online catalog.

DETAILED DESCRIPTION OF ILLUSTRATIVE EMBODIMENTS

The following description of illustrative embodiments of the various inventive features and services is intended to illustrate, and not limit, the scope of the invention. The invention is defined by the appended claims. The various features and process steps described herein are preferably embodied within software executed by general purpose computers, but may alternatively be embodied within other types of data processing systems.

In the following description, the term "affiliation" and its derivatives refer generally to a relationship between users. Depending on the context of use, these terms may refer more specifically to such a relationship as reflected within in a data repository. The term "wish list affiliation" refers more specifically to a relationship which causes a first user to be notified when an item being accessed is on, or in some cases is similar to an item on, a wish list of a second user. This type of notification is referred to herein as a "wish list notification."

I. OVERVIEW OF WISH LIST NOTIFICATION FEATURE

One feature of the present invention provides a computer-implemented service that automatically notifies a user when an item being accessed in an electronic catalog is on a wish list of a friend, relative, or other affiliated user. Each user may be permitted to explicitly designate his or her wish list affiliates. The wish list affiliations, and other types of affiliations, may additionally or alternatively be created automatically in response to user actions that imply that an affiliation exists (e.g., when one user purchases a gift for another).

The items included in the electronic catalog may be any type of item that can be purchased. For example, the items may include physical products that are shipped to customers or picked up at a local store, digital products (e.g., music files or viewable content) that are downloaded or transmitted to customers' computing devices, tickets for travel or events, services provided to customers, or a combination thereof. Further, the catalog may consist of the offerings of a single merchant, may include the items offered by a group of merchants (e.g., in an electronic mall system), and/or may include items posted for sale by end users of the system (e.g., in an online auction system).

In the example embodiment illustrated in the drawings, the notification service is implemented within a merchant web site system that may be accessed using a conventional web browser program. In other embodiments, the service may be implemented within a system in which customers access the catalog, create wish lists, and make purchases via an interactive television system, an online services network, a voice interface, wireless handheld devices, point-of-sale terminals within physical stores, or another type of system or device that supports interactive browsing. Although the terms "view" and "display" are used herein to refer generally to the process of accessing content in the illustrated embodiment, it should be understood that the catalog content and/or the associated notifications may be conveyed to users purely audibly. Further, although the catalog pages in the illustrated embodiment are web pages, other types of page displays may be used, including voiceXML pages, pages formatted for display on handheld devices, and pages formatted in accordance with a proprietary format of an online services network.

As is conventional, the merchant web site in the illustrated embodiment includes tools for browsing, searching, and purchasing items from the online catalog of items. (The term "item" is used herein to refer generally to both the thing that may be purchased and a corresponding representation in the electronic catalog, although a more specific meaning may be implied by context.) In addition, the web site may provide a service for users to post reviews of particular items.

The web site also includes a wish list service through which users can add items from the catalog to personal wish lists, and purchase items from the wish lists of others as gifts. In some cases, the wish lists may be in the form of gift registries used for weddings and other types of events. Each wish list may typically be viewed on its own, respective web page. Although web pages are used in this embodiment to create, access, and make purchases from wish lists, any of the aforementioned types of systems and devices (as well as others) can generally be used for this purpose.

Figure 1:
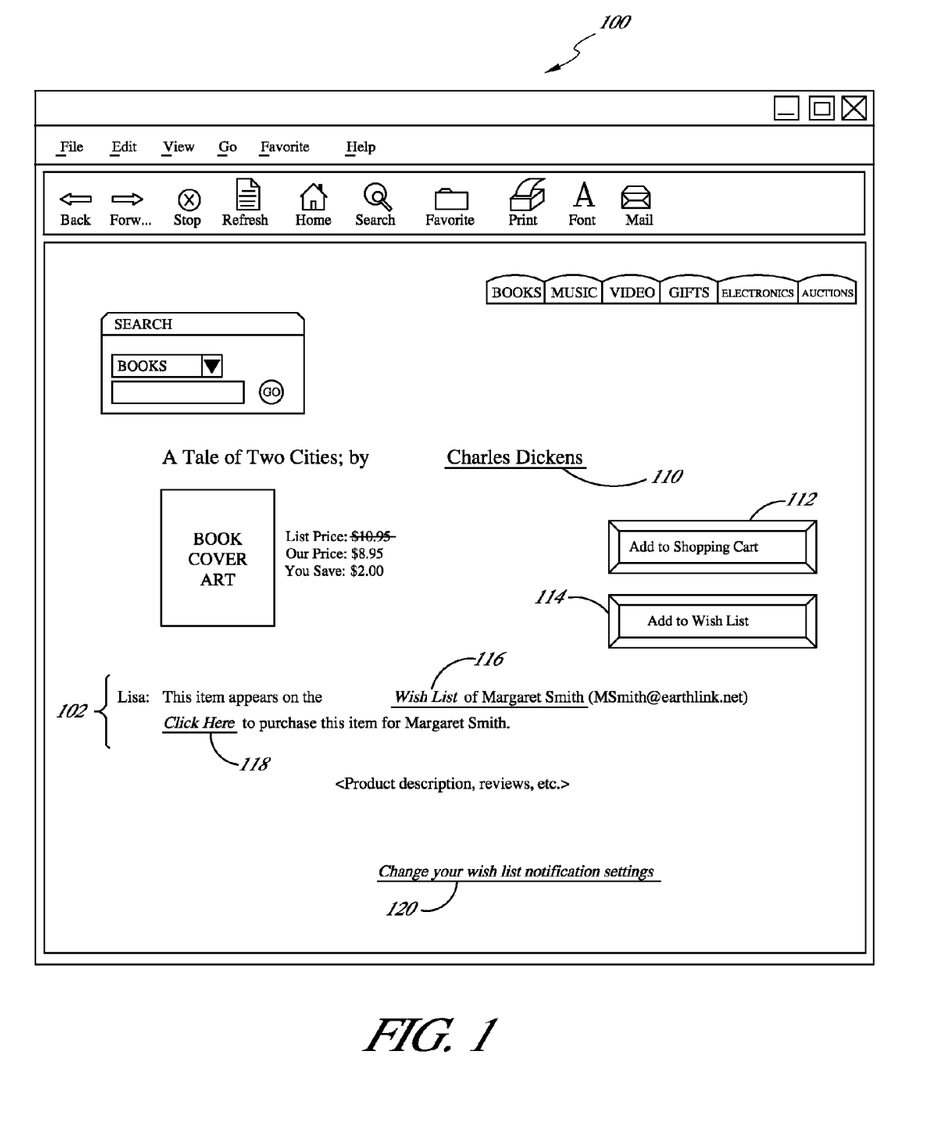
FIG. 1 illustrates a product detail page as supplemented with a notification in accordance with one feature of the invention.

In the illustrated embodiment, when a recognized user browses or navigates to an item detail page (a page dedicated primarily to a particular item) of an item that is on a wish list of a wish list affiliate (typically a friend or relative), the detail page is dynamically supplemented with a wish list notification message. FIG. 1 illustrates a sample item detail page 100 of the merchant web site, and illustrates the general form of a notification message 102 that may be displayed. As is conventional, the detail page provides detailed information about a particular item (product) that is available for purchase. One such page may be provided for each item in the electronic catalog, although a single detail page may encompass a number of variations or formats of the same item (e.g., hardcover, paperback, and audio tape versions of the same book title).

As illustrated, each detail page typically includes a description, picture, and a price of the corresponding item, and may include one or more textual reviews submitted by customers. Various other types of information relating to the item may also be displayed, as is known in the art. The detail page 100 in this example also provides a button 112 for adding the item to a personal shopping cart, and a button 114 for adding the item to a personal wish list. An option may also be provided for purchasing the item with a single selection action (not shown).

In this example, the detail page is supplemented with a notification or message 102 informing the visitor, Lisa, that the displayed item is on the wish list of one of her wish list affiliates, Margaret Smith. Margaret Smith may be a person for whom Lisa would potentially purchase gift (e.g. a friend or relative), or may simply be a person whose opinion Lisa respects (e.g., as the result of product reviews posted by Margaret). The notification may assist Lisa in deciding whether to purchase the item for herself, for Margaret, and/or for another person. The message 102 in this example includes a link 118 to Margaret Smith's wish list. As described separately below, a notification may also be displayed when the item being viewed is "similar" to an item on a wish list of an affiliate.

In some embodiments (not illustrated), the message 102 may also indicate the date the item was added to the wish list, and/or the date the wish list was last updated. These dates may be indicated either explicitly (e.g., "on May 24, 1999") or implicitly (e.g., "20 days ago").

While viewing the notification message 102 in this example, Lisa can select a link 116 to purchase the item from the wish list of Margaret Smith. In one embodiment, selection of this link 116 has the same effect as selecting a conventional "add to cart" link from Margaret Smith's wish list (i.e., the item is added to Lisa's shopping cart as a gift for Margaret). If Lisa thereafter purchases the item from her shopping cart, the item would be shipped to an address pre-specified by Margaret Smith (assuming the item is a physical product). The detail page could additionally or alternatively provide an option for the visitor to complete the wish list purchase without first adding the item to a shopping cart—such as by using a single-action ordering feature of the type described in U.S. Pat. No. 6,960,411. Further, the visitor may be required to view the affiliate's wish list before making the purchase.

When the displayed item is on the wish lists of multiple wish list affiliates of the visitor, separate messages 102 and/or links 116, 118 may be displayed for each such friend, relative, or other affiliate.

Notification messages of the type depicted in FIG. 1 may additionally or alternatively be presented within other types of pages that display information about specific items, including pages that display multiple items per page (in which case separate notifications may be displayed for each such item). For instance, when a user conducts an online search and one of the search result items is on a wish list of an affiliate, the search results page may be supplemented with a more concise notification, such as the message "On Margaret Smith's wish list!" displayed together with the item's description. Similar notifications may be displayed within pages associated with predefined categories or groups of products (e.g., browse node pages), pages that display personal recommendations, and pages that display other lists of items (e.g., "best seller" lists and purchase history lists).

The task of supplementing pages with notification messages is preferably performed at page rendering time. Specifically, when a user requests a notification-enabled page that displays an item, a determination is made whether that item is on the wish lists of any affiliates of that user. For each such affiliated customer wish list on which the item appears, a message is generated and added to the web page. To provide a high degree of performance, the wish lists of a user's affiliates may be maintained in a cache memory throughout all or a portion of the user's browsing session.

As will be apparent, any of a variety of alternative methods may be used to notify the online user that an item being accessed is on a wish list of an affiliated user. For instance, special icons or highlighting may be added to the displayed item descriptions or pages to conserve screen space. In addition, the notification messages may be presented within pop-up windows or dialog boxes, or may be displayed within separate frames. Further, the notifications may be presented audibly using pre-recorded or synthesized voice.

Further, the form or content of the notifications may be dependent upon the type of affiliation established between the users. For instance, in one embodiment, when the affiliate is merely a "favorite reviewer" of the visitor (as opposed to an actual acquaintance), the option 116 to purchase the item for the affiliate may be omitted from the notification. Further, as described separately below, the notifications 102 may include information about upcoming birthdays or other recurring gift-giving events associated with the wish list affiliates, and/or may be generated or inhibited based on whether such events are approaching.

II. CREATION OF AFFILIATIONS

Figure 2A:
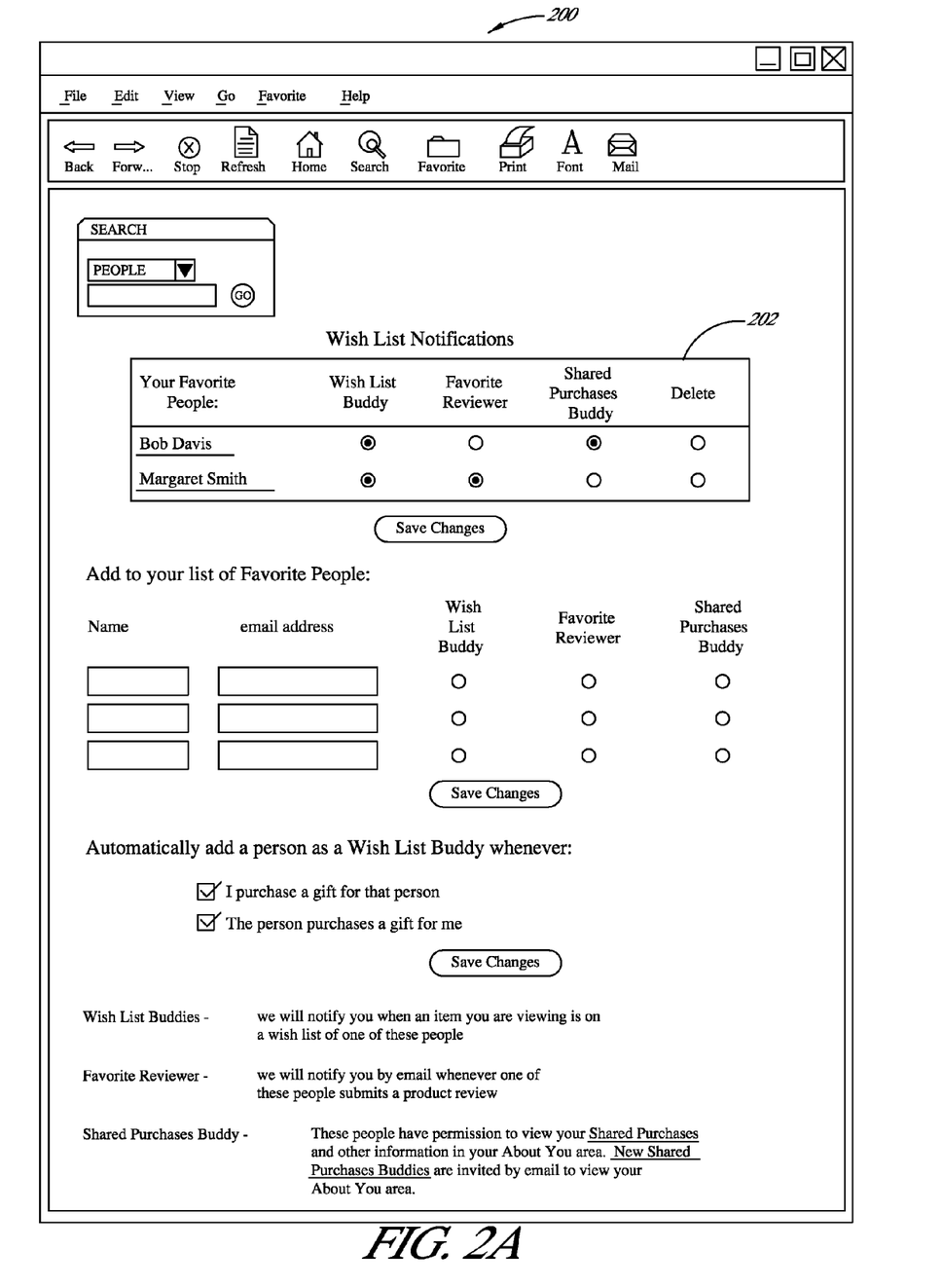
FIG. 2A illustrates a settings page from which a user can create and modify settings associated with a wish list notification service.

FIG. 2A illustrates an example settings page 200 as displayed to a hypothetical user, referred to herein as "User A." From this page, User A can explicitly create wish list affiliations (and other types of affiliations) with other users, and can specify configuration options for having wish list affiliates added automatically. Although a settings page or area is used in this example, the service may be implemented in accordance with the invention without requiring users to go through a setup process. In addition, the wish list notification service may be provided without the additional services depicted in FIG. 2A.

As illustrated in FIG. 2A, the setup page displays a list 202 of the user's "Favorite People" (two shown in this example). Adjacent to the name of each favorite person is a set of radio buttons for specifying whether each such person is a "Wish List Buddy," a "Favorite Reviewer" and a "Shared Purchases Buddy," as summarized in Table 1. Examples of methods and services relating to the submission of product reviews and the sharing of purchases are described in U.S. application Ser. Nos. 09/715,850 and 09/715,929, both filed on Nov. 17, 2000, the disclosures of which are hereby incorporated by reference.

TABLE 1

| Relationship | Service Provided |
|---|---|
| User B is a Wish List Buddy of User A | User A is notified when an item being viewed by User A is on the wish list of User B |
| User B is a Favorite Reviewer of User A | When User B submits a review, User A is notified of the submission by email |
| User B is a Shared Purchases Buddy of User A | User B is given access to User A's "About You" area, which includes a listing of any items that have both (i) been purchased by User A and (ii) been designated by User A as "shared" |

The setup page 200 also provides options for User A to add and delete Favorite People. In addition, check boxes 204 are provided for specifying whether a person should be automatically added as a Wish List Buddy of User A (a) when User A purchases a gift for that person, and (b) when that person purchases a gift for User A. Selection of a "save changes" button causes the settings to be recorded within User A's profile within a user database 324 (FIG. 3), which may be any type of data repository.

The setup page may also include an option (not shown) to enter the birthdays, anniversaries, or other recurring gift-giving events of the wish list buddies. Information about users' birthdays and anniversaries may also or alternatively be deduced or inferred based on gift purchases made for such users (see FIG. 2B), or electronic cards (e-cards) send to such users. As described below, the information about the explicitly entered or inferred special events may be used for one or more of the following: (1) to customize a wish list notification 102 with information about the upcoming birthday or other event of a wish list affiliate (see subsection V below); (2) to determine when wish list notifications 102 associated with a particular affiliate should be displayed (see subsection VII below); (3) to proactively generate special event reminders (e.g., by email), which may include links to the wish lists of the users whose events are approaching and/or recommendations for such users (see subsection VIII below).

As will be apparent from the forgoing, any of a variety of additional methods may be used for forming wish list affiliations between users. For instance, rather than allowing each User A to explicitly designate his or her wish list affiliates, users in one or more of the following categories (and others) may automatically be treated as User A's wish list affiliates: (a) User A's Favorite Reviewers; (b) User A's Shared Purchases Buddies, (c) all users listed in User A's online address book; (d) users belonging to an online community of which User A is a member, (e) users for whom User A has made wish list and/or other gift purchases (see example in FIG. 2B); (f) users who have made wish list and/or other gift purchases for User A; (g) users to whom User A has sent, and/or from whom User A has received, an e-card; (h) contacts of User A whose birthdays are known or predicted to be coming up within a predetermined time interval (as discussed separately below);

and (i) users selected by User A for purposes of promotions, referrals, or other services provided by the online store. These methods may also be used to form other types of affiliations, including affiliations for purposes of sending event reminders (discussed below). The specific methods and criteria used to form wish list affiliations may be selected based on the nature, and any preexisting community-related features, of the particular online store or system.

Users may also be permitted to designate other users as affiliates from other pages of the merchant web site. For instance, when User A views the wish list page, or another personal page, associated with User B, an option may be presented for User A to add User B as a wish list affiliate. Users may also be permitted to create explicit or implicit affiliations through actions performed on partner web sites (e.g., other web sites that are part of the same network of online stores). In addition, as mentioned above, an option may be provided for a user to specify, for each wish list affiliate, whether the notification messages should include an option 116 to purchase the displayed item for that affiliate. In one embodiment, once a user has one or more wish list affiliates, the user can navigate to a customized page that includes links to the wish lists of these affiliates.

Although the wish list affiliates are individuals in the foregoing examples, affiliate may, in some cases, be a group of individuals, such as a couple that has created a wedding gift registry or a group of family members that share an account. Further, in systems that allow a single user to have multiple wish lists, an option may be provided to select a specific wish list with which to create the affiliation.

Figure 2B:
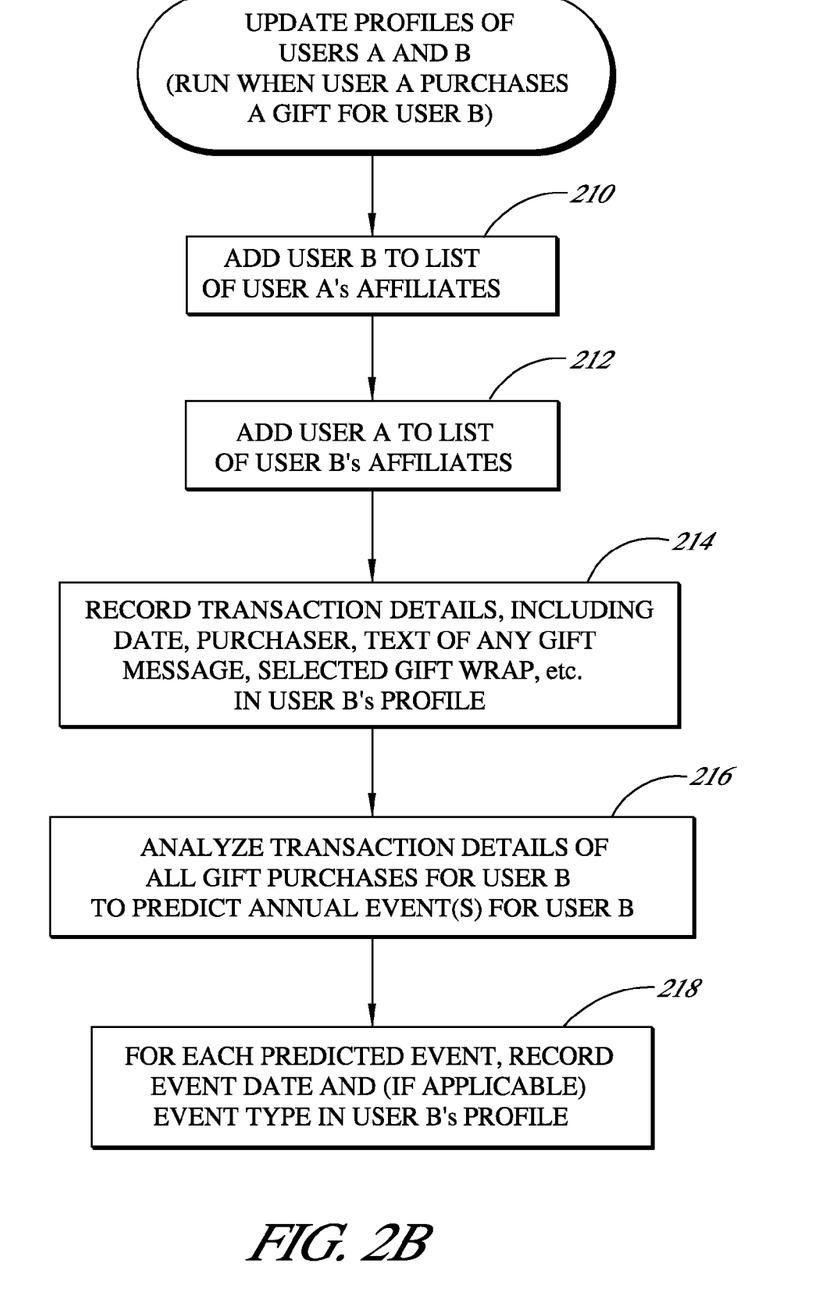
FIG. 2B illustrates a process by which gift transactions may be used to create affiliations between users and deduce annual gift-giving events of users.

FIG. 2B illustrates an example process by which affiliations may be created between users as the result of online gift purchases. This process may be used as the sole method by which wish list affiliations are formed, or may be used in combination with any of the methods described above. In this example, gift purchase events are also used to infer the date and type of a special event associated with the gift recipient, such as a birthday or anniversary.

The process of FIG. 2B is executed in response to a first user ("User A") purchasing a gift online for a second user ("User B"). It is assumed in this example that the gift purchaser is given the option to enter a gift message, and to select a gift wrap, as is conventional. As depicted in block 210, in response to the gift purchase, User A's profile is updated to include User B as a wish list affiliate of User A. This step may be contingent upon one or more of the following: (1) whether User B has a wish list; (2) whether the purchase was made from User B's wish list; (3) User A's configuration settings; (4) whether the gift is likely for an annual event, as evidenced by the gift message entered by User A and/or the gift wrap selected by User A (as discussed below). As depicted by block 212, User B's profile may similarly be updated to add User A as an affiliate.

III. INFERRED SPECIAL EVENTS

As depicted by block 214, the details of the gift transaction, such as the purchase date, purchaser, the text of the gift message entered (if any) by the purchaser, the type of gift wrap used, etc. may be added to User B's profile for purposes of predicting or inferring gift-giving events associated with User B. As depicted by block 216, this gift transaction data, and any previously recorded transaction data for other gifts purchased for User B (by User A and/or others), may then be analyzed to predict the timing and/or type of one or more annual gift-giving events (birthday, anniversary, etc.) associated with User B. As part of this process, the text of the associated gift message(s) may be analyzed to search for words such as "birthday" and "anniversary" that evidence annual gift-giving events, and to search for terms such as "wedding" and "graduation" that evidence non-annually-occurring events. Other parameters, such as the type of gift wrap selected, may also be considered. The analysis of the gift transaction data may additionally or alternatively comprise using the transaction dates to detect (1) gift purchases that occurred at about the same time in different years, and (2) brief periods in which User B received more gifts than usual.

As depicted in block 218, if the analysis of the gift transaction data renders an annual event prediction with a sufficiently high level of confidence, User B's profile is updated to indicate the predicted date, and if applicable the predicted type, of each such special event. A set of rules may be used for this purpose. For instance, a rule may specify that IF (no birthday is currently known for user) AND (a gift purchase for user is made containing message text "birthday" or with birthday gift wrap selected), THEN set user's predicted birthday date to the delivery date of the gift.

In systems which provide electronic greeting card services, similar methods to those of FIG. 2B may be used to create affiliations, and/or infer special event dates, based on greeting card transactions. For example, when User A sends an electronic birthday card to User B, a unidirectional or bi-directional affiliation may automatically be created between the two users. In addition, User B's profile may be updated to set the estimated birthday date to the e-card's delivery date.

In some embodiments, non-recurring special events inferred by the above and other methods may also be recorded and used for personalization services. For instance, if an affiliation exists between Users A and B, and User B sets up a wedding registry specifying the date of the wedding, an event reminder may be sent to User A (and others affiliated with User B) a few weeks before the wedding. This reminder may be sent by email, postal mail or a web page, and may include a link to User B's wedding registry.

IV. EXAMPLE COMPONENTS AND OPERATION

Figure 3:
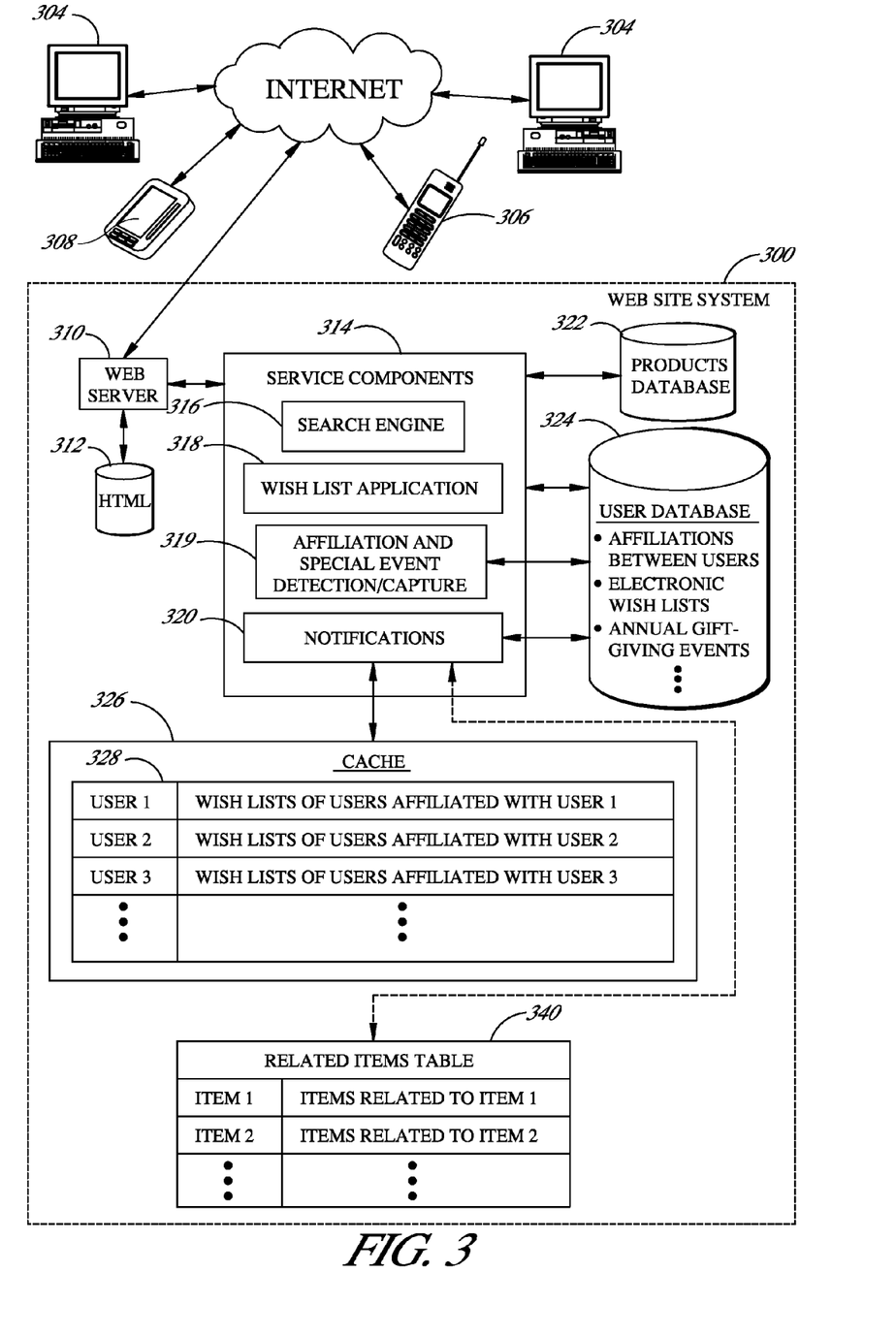
FIG. 3 illustrates example components that may be used to provide the notification service within the context of a web site.

FIG. 3 illustrates a set of components that may be used to provide the notification service within the context of a typical merchant web site system 300. The web site system 300 can be accessed remotely via the Internet 302 from a PC 304, PDA 308, or other type of computing device that runs a browser program. In some embodiments, special versions of the web site's pages may also be accessed by voice from a conventional telephone 306.

The web site system 300 includes a web server 310, a database of HTML (hypertext markup language) content 312, a set of "service components" 314 (three of which are shown), a products database 322, a user database 324, and a cache 326—all of which may be implemented using general purpose computers and associated software. In one embodiment, a related items table 340 is also provided to permit notifications to be displayed on detail pages of items that are merely related to those on the affiliates' wish lists, as described separately in subsection V below.

The HTML database 312 contains, among other things, the basic HTML documents used to generate item detail pages, search result pages, browse node pages, and other types of pages that may be displayed during the course of a browsing session. This database may also include voiceXML versions of some or all of the web site's pages to support browsing by voice. The products database 322 contains data related to the products in the online electronic catalog 300. Data such as price, product descriptions, and customer reviews are stored in the product database 322 as is known in the art. The user database 324 stores information about registered users. The information stored for a given user may include, for example, the user's wish list (typically stored as a list of product or item IDs, and optionally the date each item was added), affiliations with other users, notification settings, and various types of account information (usernames, passwords, shipping addresses, payment information, etc.).

The web server 310 accesses the service components 314 in response to page requests from users. The service components 314 include, among other things, a search engine 316, a wish list application 318, an affiliation and special event detection/capture component 319, and a notifications component 320. In one embodiment, the search engine 316 provides users with the ability to search for products in the products database, and to search for other users and their wish lists.

The wish list application 318 provides users with the ability to create electronic wish lists using methods that are known in the art. Using this application in a preferred embodiment, a user can create a personal wish list, add items to the wish list, delete items from the wish list, and specify criteria for making the wish list searchable by others. In some embodiments, the wish list application 318 allows the user to specify a desired number of units of each item.

The affiliation and special event detection/capture component 319 includes functionality for detecting affiliation-creating events (explicit and/or implicit), and for recording the affiliations in the user database 324. This component 319 may also include functionality for detecting and recording information about predicted and/or explicitly-specified annual gift-giving events of users, as described above. The functionality of this component 319 may correspond to that of FIGS. 2A and/or 2B.

In one embodiment, the notifications component 320 is responsive to requests from recognized users for item detail pages, and/or other types of pages, by determining whether a displayed item is on a wish list of an affiliated user, and if so, augmenting or supplementing the page with a notification message 102. The notifications component 320 may be invoked, for example, when a requested page includes coding specifying that it is capable of displaying wish list notifications, or when the URL of the requested page satisfies certain criteria. Information about which pages are capable of displaying wish list notifications may also be specified within a look-up table or other data repository. The notifications component 320 may also be responsible for generating proactive special event notifications as described in subsection VIII.

As illustrated in FIG. 3, the notifications component 320 may access a cache memory 326 to retrieve the wish lists of the affiliated users. For example, in one embodiment, when a recognized user enters the web site (or performs another predefined action such as logging in or accessing a detail page), the wish lists of the user's wish list affiliates, if any, are retrieved from the user database 324 and loaded into the cache 326. Throughout the subsequent browsing session, the notifications component 320 accesses the cache, as needed, to determine whether the viewed items are on these wish lists. Other information about the recognized user may also be maintained in the cache 326, such as information used for other personalization services. The cache 326 may alternatively be omitted, in which case the determination may be made by performing a database look up.

Figure 4:
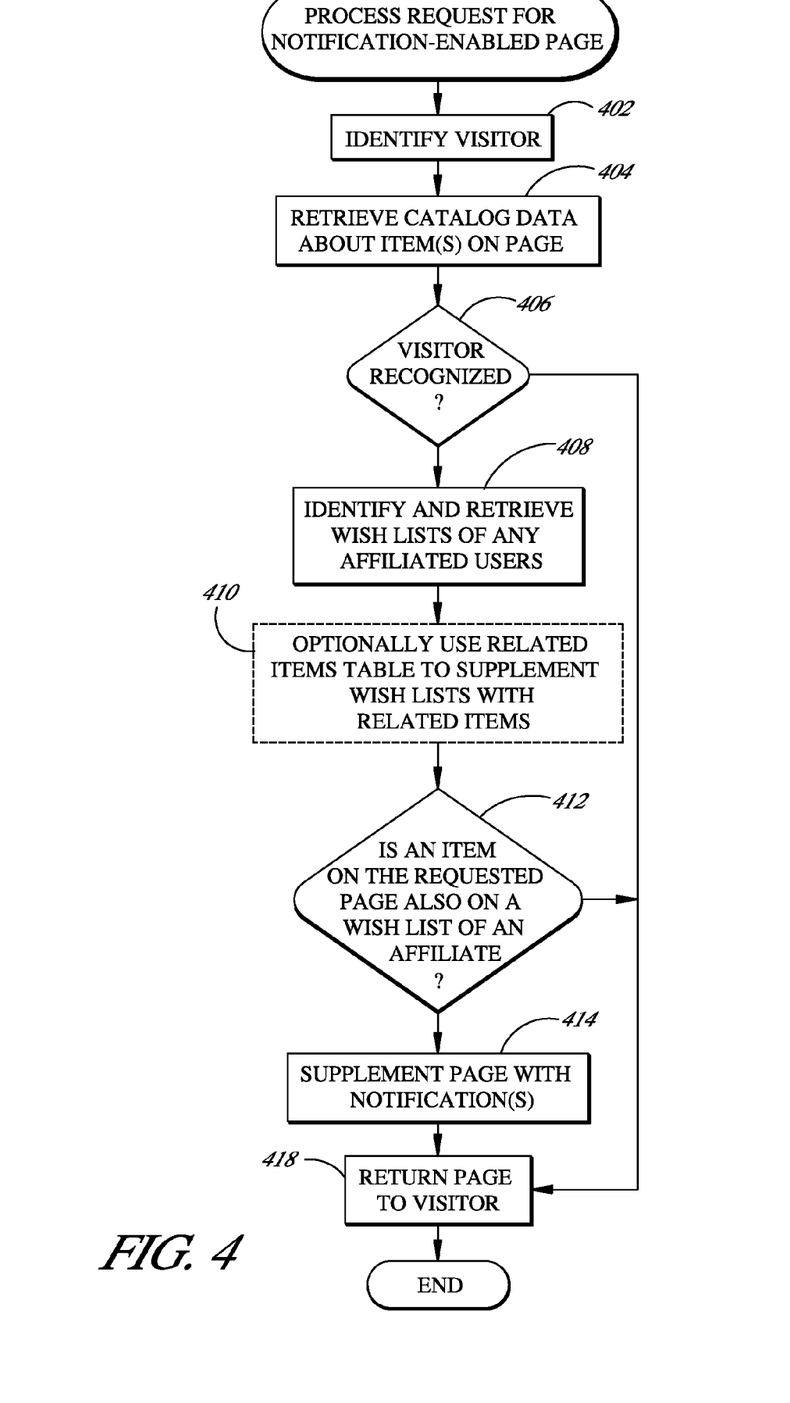
FIG. 4 illustrates an executable process for supplementing web pages with notifications.

FIG. 4 illustrates an example process by which web pages, or other types of pages, may be generated and supplemented using the notifications component 320. The process begins when the web server 310 receives a request for a notification-enabled page, such as a product detail page, that displays information about a particular item or set of items. In response to the request, the web server 310 attempts to identify the visitor using cookies, a pre-assigned session ID, and/or another appropriate method (block 402). In addition, as depicted in block 404, the web server retrieves the catalog data for the item or items to be displayed on the requested page. This data may include descriptive content read from the HTML and products databases 312, 322. As part of this process, the page may be customized for the particular visitor as in known in the art. If the visitor is unrecognized (block 406), a default version of the page may be returned.

If the visitor is recognized, the notifications component 320 determines whether the visitor has any wish list affiliates, and retrieves the wish list (if one exists) of each such affiliate (block 408). As depicted in block 410 and described in the following subsection, the notification component may also supplement these wish lists, for purposes of determining whether to supplement the page, with items that are similar or related to the actual wish list items.

As depicted in block 412, the notification component also determines whether the item or items represented on the page is/are on any of these wish lists. In some cases, this determination (block 412) is made only with respect to certain items represented on the page, and not others. For instance, when a product detail page is viewed, the determination may be made only for the product featured on that page, and not for other products that may also be listed on the page. If an item is found on a wish list of a wish list affiliate, the page is supplemented with one or more notification messages 102 as described above (block 414) and then returned to the visitor. Otherwise, the page is returned without the addition of a notification 102.

As indicated above, the process depicted in blocks 408-412 may involve the use of a cache 326, which may be implemented within the solid state RAM of a physical server (or other machine), on disk drive storage, or using a combination of disk and RAM caching. For instance, in one embodiment, when the page is requested, the notifications component 320 initially determines whether an entry exists in the cache 326 for the recognized visitor. As depicted in FIG. 3, each such entry preferably includes a user ID together with the wish lists of any wish list affiliates. If an entry exists in the cache, a determination is made whether the displayed item or items is/are on any of the wish lists in that entry. Otherwise, the user database 324 is accessed to look up, and to retrieve the wish lists of, the affiliates of the visitor. The information read from the user database is used both to create a new entry to store in the cache, and to make the determinations of block 412. Each entry may be maintained in the cache for a predefined period of time (e.g., 10 minutes) from its creation or last access.

V. EXTENSION OF NOTIFICATION SERVICE TO RELATED ITEMS

One optional extension to the wish list notification service is to also notify the visitor when an item that is related or "similar" to the displayed item is on a wish list of an affiliate. For instance, when a visitor accesses a detail page associated with a particular brand and model of MP3 player, the page may be supplemented to indicate that an MP3 player of another brand/model is on the wish list of an affiliate. The notification text used in this event may explicitly indicate that the item on the affiliate's wish list is related to the displayed item.

To implement this feature, the web site system preferably includes a "related items" table 340 (FIG. 3) that maps individual items from the products database 322 to respective sets of related items. This table may be used to effectively supplement the retrieved wish lists, as depicted in block 410, with items similar to those on the wish lists. For instance, for each wish list item, the table may be accessed to identify the N (e.g., 3) most similar items, and these similar items may be recorded in the cache in association with the actual wish list items to which they correspond.

The related items table 340 may be obtained from an external source, or may be derived from product descriptions and/or product classifications stored in the products database 322. Further, the table may be generated based on an automated, collective analysis of the browsing histories of a population of users. For example, in one embodiment, an off-line executable process periodically analyzes the browsing histories of a population of users to identify related items, as described in U.S. Pat. No. 6,266,649 and in U.S. patent application Ser. No. 09/821,712 filed Mar. 29, 2001, the disclosures of which are hereby incorporated by reference. The metrics used to determine whether two items, A and B, are similar may include one or more of the following metrics: (a) the frequency with which users who viewed A during a browsing session also viewed B during the same browsing session; (b) the frequency with which users who purchased A also purchased B; (c) the frequency with which users who added A to their respective shopping carts also added B to their shopping carts; (d) the frequency with which users who added A to their respective wish lists also added B to their wish lists.

In one embodiment, the task of determining whether the accessed item is similar to items on the wish lists of the wish list affiliates ("similarity determination") is invoked only if the displayed item itself is not on the wish list of any wish list affiliate of the visitor. In another embodiment, the similarity determination is performed only with respect to those wish lists on which the displayed item itself is not found. In yet another embodiment, the similarity determination is performed for each affiliate wish list, regardless of whether the accessed item is on a wish list of an affiliate. In each of these three cases, if it is determined that the accessed item is similar to an affiliate's wish list item, the visitor is so notified.

VI. CUSTOMIZING PAGES BASED ON VISITOR'S OWN WISH LIST

Another extension, which is not depicted in FIG. 4, is to customize the requested page based on whether the item being viewed is on the visitor's own wish list. In one embodiment, the page is so customized by displaying a button, link, or other option to remove the item from the wish list. For instance, in the example of FIG. 1, the "add to wish list" button 114 may simply be changed to a "remove from your wish list" button. Alternatively, the page may simply be supplemented with a message such as "this item is currently on your wish list." Further, the visitor may be notified when the displayed item is merely similar to an item on his or her own wish list, as may be determined using the same similarity determination process as described above.

VII. USE OF KNOWN OR PREDICTED DATES OF RECURRING GIFT GIVING EVENTS

Another extension, which may be implemented alone or in combination with those of subsections V and VI above, is to incorporate known and/or predicted information about recurring gift-giving events (e.g., birthdays) into the wish list notification service. For instance, as indicated above, users may be given the option to specify the birthdays, anniversaries and/or other recurring events of their wish list affiliates (and possible other classes of users) through a setup page of the online store. This information may then be used in a variety of ways to assist users in buying gifts for those whose recurring events are approaching. The date of a user's birthday or other special gift giving event may also be predicted by the system as described above, and as further described in U.S. patent application Ser. No. 09/552,128, filed Apr. 19, 2000, the disclosure of which is hereby incorporated by reference.

In one embodiment, when it is determined in block 412 (FIG. 4) that a displayed item is on a wish list of a wish list affiliate, an additional look-up is performed to determine whether a known or predicted recurring (annual) event of the affiliate falls within a predetermined time period, such as the next two months. When it does, the notification 102 is augmented with information about that recurring event. For example, the notification may include the text "the item you are viewing is on the wish list of Bob Johnson, whose birthday is in 12 days," or "the item you are viewing is on the wish list of Bob Johnson, for whom you purchased a gift on July 22 of last year."

The known or predicted recurring event data may also be used to identify the visitor's wish list affiliates in block 408 of FIG. 4. Specifically, a user who is affiliated generally with the visitor may be treated as a wish list affiliate only when a recurring or non-recurring special event of that user is coming up within a predetermined time period (e.g., 3 months). With this method, a visitor's wish list affiliates change automatically over time. This method of identifying wish lists affiliates may, for example, be used by default for affiliates whose dates have been entered into the system, and/or may be provided as a configuration option.

For example, in one embodiment, a first user is automatically treated as a wish list affiliate of a second user when the anniversary of a previous gift purchase by the first user for the second user is approaching. For instance, if User A buys a gift for User B on Sep. 1, 2000, User B may automatically be treated as a wish list affiliate of User A during a selected time interval (e.g., one month) which encompasses Sep. 1, 2001. This association between Users A and B may continue for as long as User A continues purchasing gifts for User B on or around September 1.

VIII. EVENT REMINDER SERVICES

Another feature, which may be implemented alone or in combination with those described in the preceding subsections, involves generating automatic gift-giving event reminders based on the known or inferred special event data of users. The reminders are preferably conveyed by electronic mail, but may alternatively be presented within a web page or other online display. Each reminder preferably includes a link to the wish list of the person whose known or predicted special event date is approaching (if such a wish list exists), and/or a set of personalized gift recommendations for that person.

Figure 5:
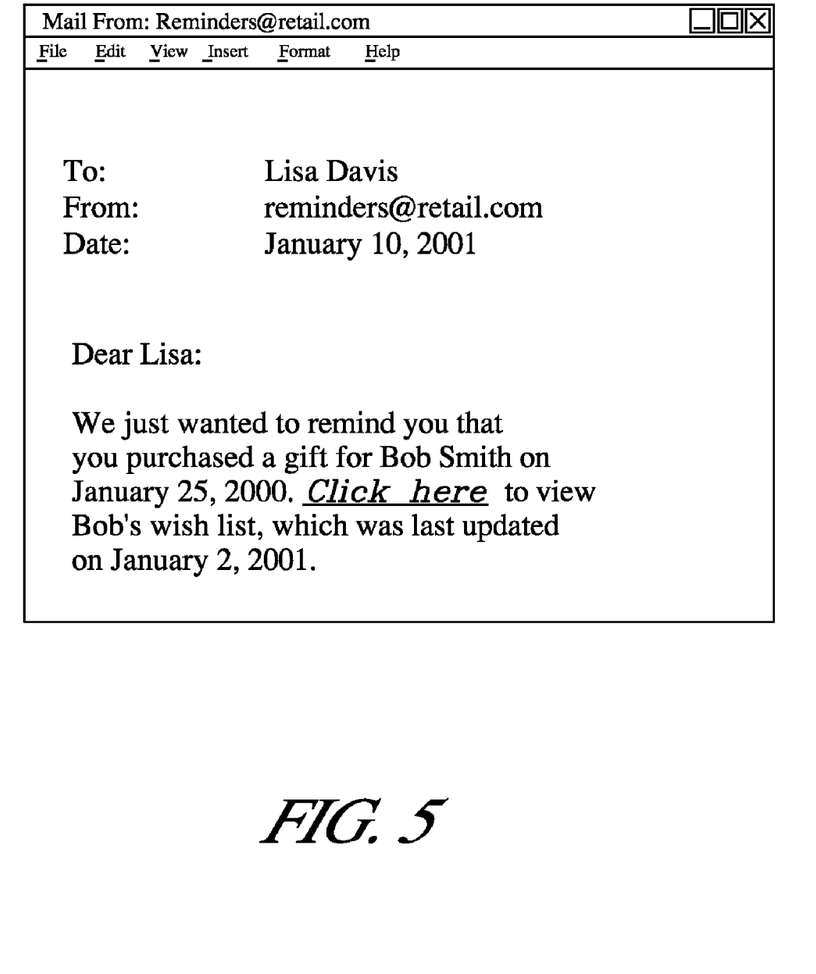
FIG. 5 illustrates example content of a reminder email in which a user is reminded of a prior gift purchase made for another user, and is provided with a link to the wish list of that other user.

FIG. 5 illustrates an example of an email-based reminder that may be generated by the event reminder service. In this example, Lisa, the recipient of the reminder, previously purchased a gift item from Bob Smith's wish list on Jan. 25, 2000. Because the anniversary of that purchase event is approaching (e.g., is within a selected time interval, such as 10, 20 or 50 days), the reminder service has automatically generated an email to Lisa reminding her of the possible recurring event associated with Bob. This email includes a selectable link 502 to Bob's wish list, which may be selected to retrieve the corresponding wish list page. In another embodiment, the wish list is bodily incorporated into the email. In the case of known or predicted annual event dates, the email may specifically identify the event that is approaching (e.g., "Bob Smith's birthday is coming up—click here to view Bob's wish list."). The email may also or alternatively include a list of gift recommendations for Bob, or a link to such a list.

Figure 6:
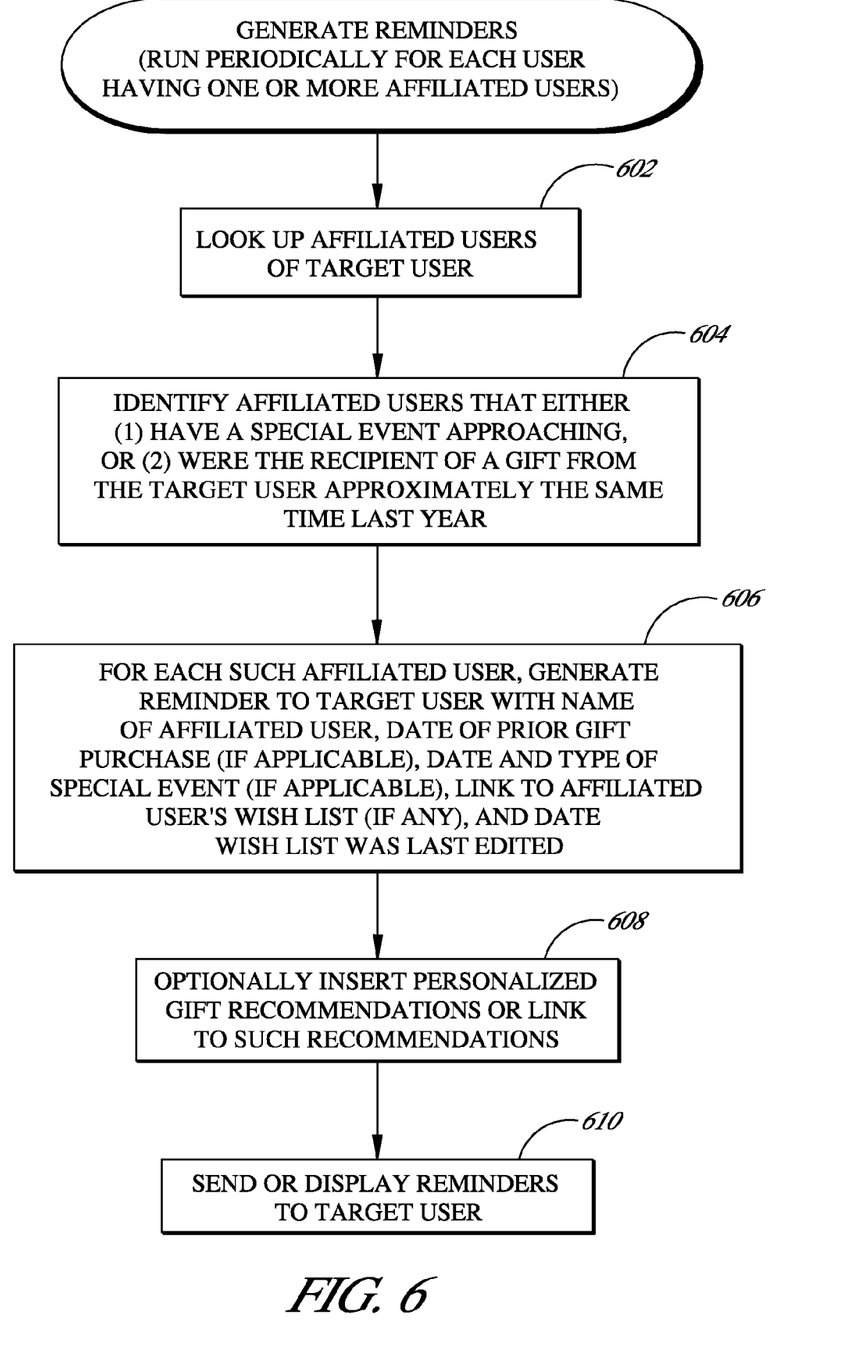
FIG. 6 illustrates an executable process for generating reminders of the type shown in FIG. 5.

FIG. 6 illustrates an example process that may be used to generate event reminders of the type shown in FIG. 5. This process may be run periodically for each user ("target user") who has one or more affiliates. The types or classes of affiliations recognized for purposes of generating the reminders may, but need not be, the same as those used for generating wish list notifications 102. As depicted in blocks 602 and 604, the process initially looks up the target user's affiliates, and then determines whether any of these users either (1) has a known or predicted special event approaching (e.g., coming up within a selected number of days), or (2) was the recipient of a gift from the target user at approximately the same time last year. As depicted in block 606, for each affiliate that satisfies (1) and/or (2), a reminder message is generated for the target user. This reminder may include the name of the affiliated user, the date of the prior purchase (if applicable), and the predicted or known date and type of the special event (if applicable). In addition, as illustrated in FIG. 5, if the affiliate has a wish list, a link to this wish list is generated and inserted into the message text, together with the date this wish list was last updated.

As depicted in block 608, a list of personalized gift recommendations for the affiliate, or a link to such recommendations, may also be inserted. For example, in one embodiment, if the affiliate does not have a wish list, a set of personal gift recommendations for the affiliate is generated and inserted into the email in place of the link to the wish list. The recommendations may be derived from the affiliate's purchase history, and/or other information known about the affiliate, using the methods described in U.S. Pat. No. 6,266,649. In another embodiment, the gift recommendations are generated and inserted even if the affiliate has a wish list (in which case the wish list itself may be used to derive the recommendations using the methods set forth in the '649 patent).

As depicted in block 610, each such reminder is then conveyed to the target user—preferably by email, but alternatively within a customized web page (e.g., the home page of the online store) or other display. Multiple reminders may be aggregated within an email or web page.

Figure 7:
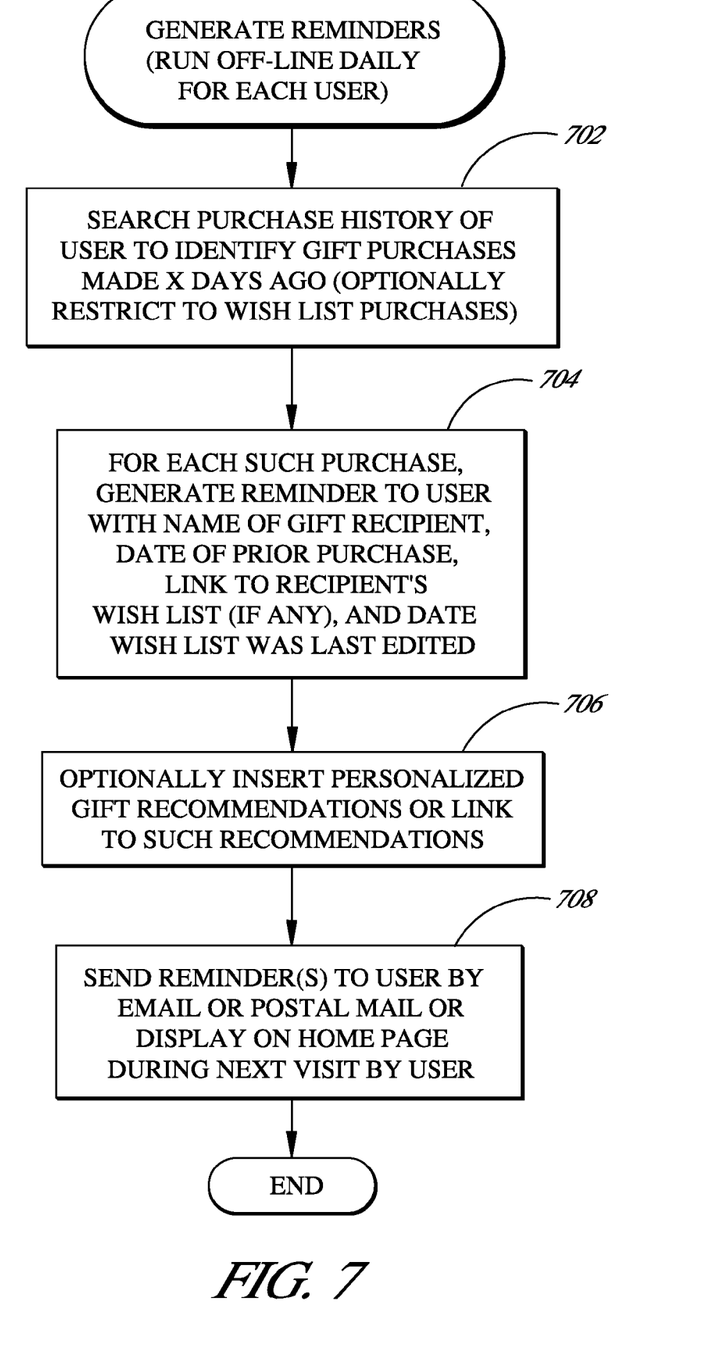
FIG. 7 illustrates another executable process for generating reminders of the type shown in FIG. 5.

Reminders of the type illustrated in FIG. 5 may also be generated in embodiments in which no information is explicitly stored about affiliations between users or special events of users. FIG. 7 illustrates one example of a reminder generation process that may be used in such embodiments. In this example, the process is executed once per day for each user of the system having a purchase history. The purchase history may, in some embodiments, reflect purchases made from partner stores or web sites. As depicted by block 702, the user's purchase history is initially searched to determine whether the user purchased a gift X days ago, where X is a number such as 350 which corresponds to a selected time interval before the anniversary of the purchase date. The scope of the search may optionally be restricted to purchases from wish lists, and/or purchases for which the gift message text or gift wrap evidences that the gift was for an annual event. As depicted in block 704, for each identified purchase, a reminder is generated listing the gift recipient ("recipient") and the date of the prior purchase (as in FIG. 5). If the recipient has a wish list, a link to this wish list is generated and inserted into the message text (as in FIG. 5), together with the date this wish list was last updated. As depicted in block 706, personalized gift recommendations for the recipient (which may be generated as described above), or a link to such recommendations, may also be inserted. As depicted in block 708, each reminder is then transmitted to the user by email, or is displayed to the user during the next visit to the online store.

The methods depicted in FIGS. 6 and 7 and described above may also be used to generate and send physical promotional materials to users. For instance, N days before the known or predicted special event of a user, a flyer or card may be printed and sent by postal mail to the affiliates of that user. The flyer or card may include the event date and type, may include the URL or other identifier of the user's wish list (if one exists), and/or may include a personalized set of gift recommendations for the user.

IX. NOTIFICATIONS OF WISH LIST MODIFICATIONS

Yet another feature that may be embodied within the online store, either alone or in combination with the features described in the foregoing subsections, is a service for notifying users when their affiliates make changes to their respective wish lists. In one embodiment, when a user adds a new item to his or her wish list, the user database 324 is accessed to determine whether this user is affiliated with any other users. If so, an email is sent to such other users providing a link to the updated wish list and indicating that the wish list has been changed. The notifications may alternatively be presented to the other users within web pages when such users subsequently access the online store.

X GIFT REGISTRY AND AUCTION SYSTEMS

One type of system in which the wish list notification service may be embodied is an electronic gift registry system used by retailers with physical stores. The electronic catalog in such a system is commonly browsed via an in-store terminal, although some retailers also permit remote browsing via a web site. In such a system, the shopper may be permitted to select one or more gift registries for purposes of establishing wish list affiliations, and may thereafter browse the merchant's catalog. When a description is displayed of an item that is on one of the designated gift registries/wish lists, a notification 102 is displayed as set forth above. In some embodiments, this notification may indicate a quantity of the item remaining within in the registry (e.g., "10 requested, 5 have been purchased).

Event reminder services of the type described in subsection VIII may also be embodied within such a gift registry system. For instance, as described in subsection III, if an affiliation exists between Users A and B, and User B sets up a wedding registry specifying the date of the wedding, an event reminder may be sent to User A (and others affiliated with User B) a few weeks before the wedding.

Another type of system in which the wish list notification service may be used is an online auction system. In such a system, the notifications 102 may be presented on auction item detail pages in the same manner as set forth above.

XI. CONTACT MANAGEMENT SYSTEMS

The various features described above may also be implemented in the context of a networked electronic contact management system of the type described in U.S. Pat. No. 6,269,369. In such a system, users establish affiliations with other users for purposes of sharing personal information. Once two users establish an affiliation, each may specify the items of personal information (phone number, address, birthday, etc.) the other may access. A user of the system may view the information of his or her affiliates or "contacts" through a virtual address book interface.

In such a system, some or all of a user's contacts may be treated as affiliates for purposes of generating wish list notifications and/or special event reminders. For example, a user may be permitted to designate which contacts are to be treated as wish list affiliates; or this determination may be made automatically based on the associated access permissions granted. Further, when a first user is notified of an upcoming event of a second user, the notification may include a link to the second user's wish list, if one exists.

XII. CONCLUSION

Although the various inventive features and services have been described in terms of certain preferred embodiments, other embodiments that are apparent to those of ordinary skill in the art, including embodiments which do not provide all of the benefits and features set forth herein and do not address all of the problems set forth herein, are also within the scope of this invention. Accordingly, the scope of the present invention is defined only by reference to the appended claims.

What is claimed is:

1. A computer-implemented method of assisting users in purchasing gifts associated with gift-giving events, the method comprising:

maintaining an electronic wish list of a first user in computer storage, the electronic wish list including items selected from an electronic catalog by the first user and being accessible to other users;

inferring information regarding a recurring gift-giving event associated with the first user based on gift transaction data that identifies at least one gift purchased from the electronic catalog for the first user by another user, wherein inferring the information regarding the recurring gift-giving event comprises analyzing the gift transaction data to assess whether the gift was purchased in connection with a recurring event;

determining that an affiliation exists between the first user and a second user; and automatically sending to the second user, based at least partly on the inferred information and the determination than an affiliation exists, a message regarding the recurring gift-giving event associated with the first user together with a link to the electronic wish list of the first user, to thereby facilitate purchasing of a gift associated with the recurring gift-giving event;

said method performed in its entirety by a computer system.

2. The method of claim 1, wherein inferring information regarding the recurring gift-giving event comprises automatically predicting a timing of the recurring gift-giving event.

3. The method of claim 2, wherein automatically predicting the timing of the recurring gift-giving event comprises using a purchase date of the gift purchased for the first user to predict the timing of the recurring gift-giving event.

4. The method of claim 1, wherein inferring information regarding the recurring gift-giving event comprises inferring a type of the gift-giving event at least partly by analyzing gift message text entered by a purchaser of the gift for the first user.

5. The method of claim 1, wherein inferring information regarding the recurring gift-giving event comprises inferring a type of the recurring gift-giving event based at least partly on a type of gift wrap selected by a purchaser of the gift.

6. The method of claim 1, wherein inferring information regarding the recurring gift-giving event comprises determining that gifts were purchased for the first user at approximately the same time in different years.

7. The method of claim 1, wherein the method comprises inferring information regarding the recurring gift-giving event based collectively on gift purchases made for the first user by each of a plurality of additional users.

8. The method of claim 1, wherein determining that an affiliation exists between the first user and a second user comprises automatically treating the second user as being affiliated with the first user as the result of at least one of (a) a gift purchase made by the second user for the first user, and (b) a gift purchase made by the first user for the second user.

9. The method of claim 1, wherein determining that an affiliation exists between the first user and a second user comprises automatically treating the second user as being affiliated with the first user as the result of at least one of (a) transmission of an electronic card by the first user to the second user; and (b) transmission of an electronic card by the second user to the first user.

10. The method of claim 1, further comprising automatically generating a list of recommended gifts for the first user based on stored information reflective of preferences of the first user, and providing said list to the second user as part of, or in association with, said message, said list of recommended items being separate from said wish list.

11. The method of claim 1, wherein the message and link are sent to the second user by electronic mail.

12. The method of claim 1, wherein the computer system comprises a plurality of computers.

13. The method of claim 1, wherein the gift is a gift purchased by said second user.

14. The method of claim 1, wherein the recurring gift-giving event is an annual gift-giving event.

15. A system, comprising:

a detection system that automatically detects affiliations between users, and infers information regarding recurring gift giving events of users, based at least partly on gift purchasing activities of the users, said detection system operative to infer information about the recurring gift giving events by analyzing gift transaction data to assess whether particular gift purchases were made in connection with recurring gift-giving events; and a notification system configured to use data regarding the detected affiliations, and the inferred information regarding the recurring gift giving events, to generate notification messages regarding upcoming recurring gift giving events of particular users, said notification system configured to send the notification messages to users who are affiliated with said particular users.

16. The system of claim 15, wherein at least some of the notification messages include links to electronic wish lists of the respective users whose recurring gift giving events are upcoming.

17. The system of claim 15, wherein the detection system is configured to analyze gift message text entered by gift purchasers to assess whether corresponding purchases correspond to recurring gift giving events.

18. The system of claim 15, wherein the notification system is capable of generating, for transmission to a first user, a notification message that (1) identifies a gift purchase previously made by the first user for a second user, and (2) includes a link to a wish list of the second user.

19. The system of claim 18, wherein the notification system is additionally capable of including gift recommendations, or a link to gift recommendation, in said notification message, said gift recommendations based on information reflective of item preferences of the second user.

20. The system of claim 15, wherein the notification system is capable of generating a notification message that notifies a first user of an inferred recurring gift giving event of a second user, said inferred recurring gift giving event based at least partly on a prior gift purchase made by the first user for the second user.

21. The system of claim 20, wherein the notification message includes at least one of the following: (1) a link to a wish list of the second user; (2) auto-generated personalized recommendations of gifts for the second user; (3) a link for viewing auto-generated personalized recommendations of gifts for the second user.

22. The system of claim 15, wherein the detection system is operative to infer information about the recurring gift giving events based at least partly on gift wrap selections of gift purchasers.

23. The system of claim 15, wherein the recurring gift giving events include annual gift giving events.

24. A computer storage system that stores executable code that directs a computer system to perform a process that comprises:

inferring information regarding a recurring gift-giving event associated with a first user based on gift transaction data that identifies at least one gift purchased from an electronic catalog for the first user by another user, wherein inferring the information regarding the recurring gift-giving event comprises analyzing the gift transaction data to assess whether the gift was purchased in connection with a recurring event;

determining that an affiliation exists between the first user and a second user; and automatically sending to the second user, based at least partly on the inferred information and the determination than an affiliation exists, a message regarding the recurring gift-giving event associated with the first user.

25. The computer storage system of claim 24, wherein the message includes a link to an electronic wish list of the first user.

26. The computer storage system of claim 24, wherein inferring information regarding the recurring gift-giving event comprises inferring a type of the gift-giving event based on at least one of the following: (1) gift message text entered by a purchaser of the gift for the first user, (2) a type of gift wrap selected by a purchaser of the gift for the first user.

* * * * *